UNITED STATES PATENT OFFICE.

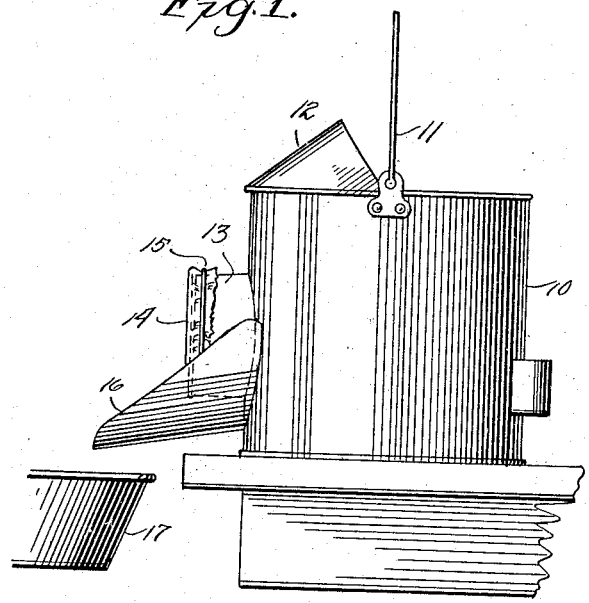
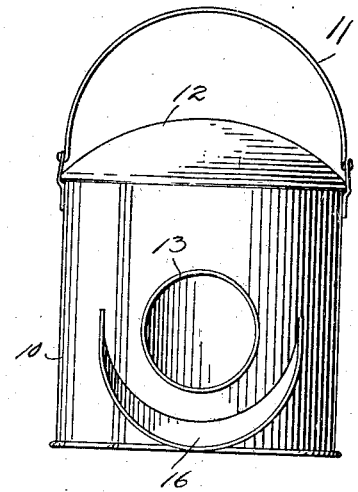
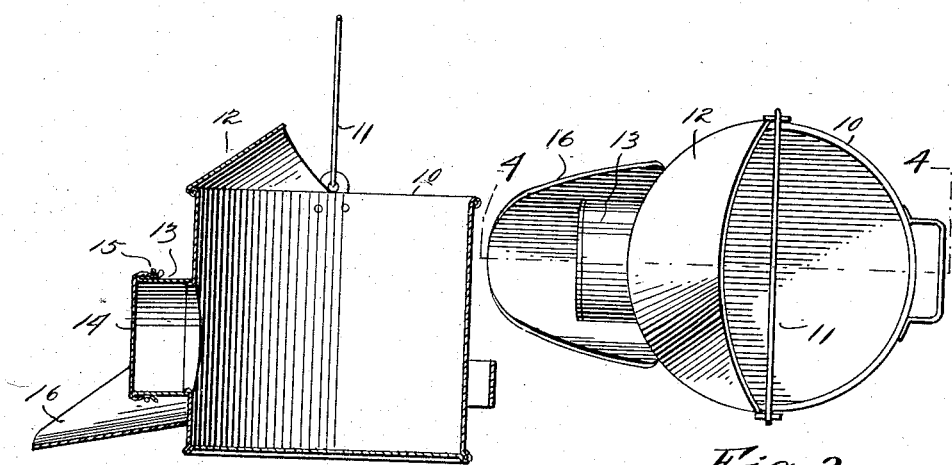

FRANK SHEPHERD, OF FOREST GREEN, MISSOURI.

STRAINING-RECEPTACLE.

1,227,008.  Specification of Letters Patent.  Patented May 22, 1917.

Application filed August 21, 1916. Serial No. 116,134.

*To all whom it may concern:*

Be it known that I, FRANK SHEPHERD, a citizen of the United States, residing at Forest Green, in the county of Chariton, State of Missouri, have invented certain new and useful Improvements in Straining-Receptacles; and I do hereby declare the following to be a full, clear, and exact description of the invention, such as will enable others skilled in the art to which it appertains to make and use the same.

This invention relates to improvements in straining receptacles and particularly to receptacles for straining milk or like fluids.

The principal object of the present invention is to provide a device of this character wherein the foreign matter in the milk will be prevented from getting into and clogging up the straining cloth or wire.

Another object is to provide a device of this character whereby the milk can be strained without the necessity of tilting the receptacle until practically all of the milk has flowed therefrom.

Other objects and advantages will be apparent from the following description when taken in connection with the accompanying drawing.

In the drawing:

Figure 1 is a side elevation of a straining receptacle made in accordance with my invention, showing the operation thereof.

Fig. 2 is a top plan view of the same.

Fig. 3 is a front elevation of the device.

Fig. 4 is a vertical transverse sectional view on the line 4—4 of Fig. 2.

Referring particularly to the accompanying drawing, 10 represents a receptacle formed of any suitable metal or other material and provided with a pivoted bail 11, for carrying the same. A portion of the open upper end of the receptacle is covered by means of a hood 12, which prevents the spilling of the milk when pouring the same therefrom. In one side, and near the bottom of the receptacle, is secured a short pipe of suitable diameter, as shown at 13, the same projecting outwardly from the receptacle and adapted to have a straining cloth 14 placed over the outer end and secured thereto by passing a suitable band 15 therearound. Secured to the outer face of the receptacle, below the pipe 13, is a downwardly and outwardly inclined chute 16, the same projecting a suitable distance beyond the outer end of the pipe.

In the operation of the device, the receptacle is placed on a table, or may be held in the hand, after a straining cloth is properly secured over the outer end of the pipe. The receptacle is so placed or held that the outer end of the chute will be in position to discharge into another receptacle, as shown at 17, placed therebelow. The receptacle 10 is then filled with the milk or other fluid to be strained. The receptacle is held in an upright position while the liquid passes through the straining cloth, down the chute, and into the receptacle 17. When the level of the liquid in the receptacle 10 is below the lower side of the pipe 13, the receptacle may then be tilted to permit the remainder of the fluid to pass through the strainer. Thus practically all of the sediment or other foreign matter and grease, will be permitted to settle to the bottom of the receptacle, and be effectively prevented from clogging up the straining cloth. The pipe 13 is purposely located a short distance above the bottom of the receptacle, thereby preventing the sediment running out with the liquid, or coming in contact with the straining cloth.

If desired the receptacle may be placed on a table and the receptacle 17 placed on the floor directly beneath the chute, or elevated by means of a chair, box or other suitable means.

What is claimed is:

In a straining device, a receptacle, a discharge pipe located in the side of the receptacle and adjacent the bottom thereof, a straining means mounted on the outer end of the pipe, and a downwardly and outwardly extending chute located below the pipe and extending below the bottom of the receptacle, whereby the contents of the receptacle will flow therefrom without the necessity of tilting the receptacle.

In testimony whereof, I affix my signature, in the presence of two witnesses.

FRANK SHEPHERD.

Witnesses:
J. M. BENTLEY,
P. E. TECKEMEYERS.

Copies of this patent may be obtained for five cents each, by addressing the "Commissioner of Patents, Washington, D. C."